US012669395B2

(12) United States Patent　　　(10) Patent No.: US 12,669,395 B2
Mori et al.　　　　　　　　　　　　(45) Date of Patent: Jun. 30, 2026

(54) CHARACTERISTIC ADJUSTMENT SYSTEM OF PRESSURE DETECTION OUTPUT AND CHARACTERISTIC ADJUSTMENT METHOD OF PRESSURE DETECTION OUTPUT

(71) Applicant: Wacom Co., Ltd., Saitama (JP)

(72) Inventors: Yuto Mori, Saitama (JP); Mamoru Ogata, Saitama (JP); Kenichi Ninomiya, Saitama (JP)

(73) Assignee: Wacom Co., Ltd., Saitama (JP)

( * ) Notice: Subject to any disclaimer, the term of this patent is extended or adjusted under 35 U.S.C. 154(b) by 428 days.

(21) Appl. No.: 18/322,883

(22) Filed: May 24, 2023

(65) Prior Publication Data

US 2023/0324247 A1　　Oct. 12, 2023

Related U.S. Application Data

(63) Continuation of application No. PCT/JP2021/041918, filed on Nov. 15, 2021.

(30) Foreign Application Priority Data

Dec. 1, 2020　(JP) ................................. 2020-199473

(51) Int. Cl.
　G01L 25/00 　　(2006.01)
　G01L 1/14 　　(2006.01)
　　　(Continued)

(52) U.S. Cl.
　CPC .............. G01L 25/00 (2013.01); G01L 1/144 (2013.01); G01L 5/22 (2013.01); G06F 3/03545 (2013.01)

(58) Field of Classification Search
　CPC . G01L 5/22; G01L 25/00; G01L 1/144; G01L 1/146; G06F 3/03545; G06F 3/044; G06F 3/046
　See application file for complete search history.

(56) References Cited

U.S. PATENT DOCUMENTS 9,063,025 B2 *　6/2015　Horie ...................... G06F 3/046
10,216,292 B2 *　2/2019　Munakata ........... G06F 3/03545
(Continued)

FOREIGN PATENT DOCUMENTS

EP　　　0743590 A2 * 11/1996 ............. G06F 3/033
JP　　H06242877 A * 9/1994
(Continued)

OTHER PUBLICATIONS

International Search Report, mailed Feb. 15, 2022, for International Patent Application No. PCT/JP2021/041918. (2 pages) (English translation).

*Primary Examiner* — Octavia Hollington
(74) *Attorney, Agent, or Firm* — Seed Intellectual Property Law Group LLP

(57)　　　　　　ABSTRACT

A characteristic adjustment system of pressure detection output. The characteristic adjustment system includes an input tool that performs an input operation by being brought into contact with an input surface and that includes a pressure detector that detects a pressure applied to a portion of the input tool in contact with the input surface, a detection device that generates pressure detection output by acquiring information regarding the pressure detected by the pressure detector of the input tool, a load measurement device that measures a load applied to the input tool, and an adjustment device that adjusts the pressure detection output from the detection device such that the pressure detection output has characteristics in a predetermined relation to a load measurement result from the load measurement device.

17 Claims, 11 Drawing Sheets

(51) Int. Cl.
    *G01L 5/22*          (2006.01)
    *G06F 3/0354*     (2013.01)

(56)             References Cited

U.S. PATENT DOCUMENTS

| | | | |
|---|---|---|---|
| 10,275,093 B2 * | 4/2019 | Hanada | ................. G06F 3/0418 |
| 11,010,002 B2 * | 5/2021 | Tanaka | ................. G06F 3/0383 |
| 12,056,297 B2 * | 8/2024 | Ito | ........................ G06F 3/03545 |
| 2013/0199311 A1 | 8/2013 | Horie et al. | |
| 2016/0188016 A1 | 6/2016 | Munakata et al. | |
| 2017/0371434 A1 * | 12/2017 | Kobori | ................. G06F 3/0383 |

FOREIGN PATENT DOCUMENTS

| | | | | |
|---|---|---|---|---|
| JP | H06301463 | A | * | 10/1994 |
| JP | 3903543 | B2 | * | 4/2007 |
| JP | 2013161307 | A | | 8/2013 |
| JP | 2016126503 | A | | 7/2016 |
| JP | 2017216002 | A | | 12/2017 |
| JP | 2019016038 | A | | 1/2019 |

* cited by examiner

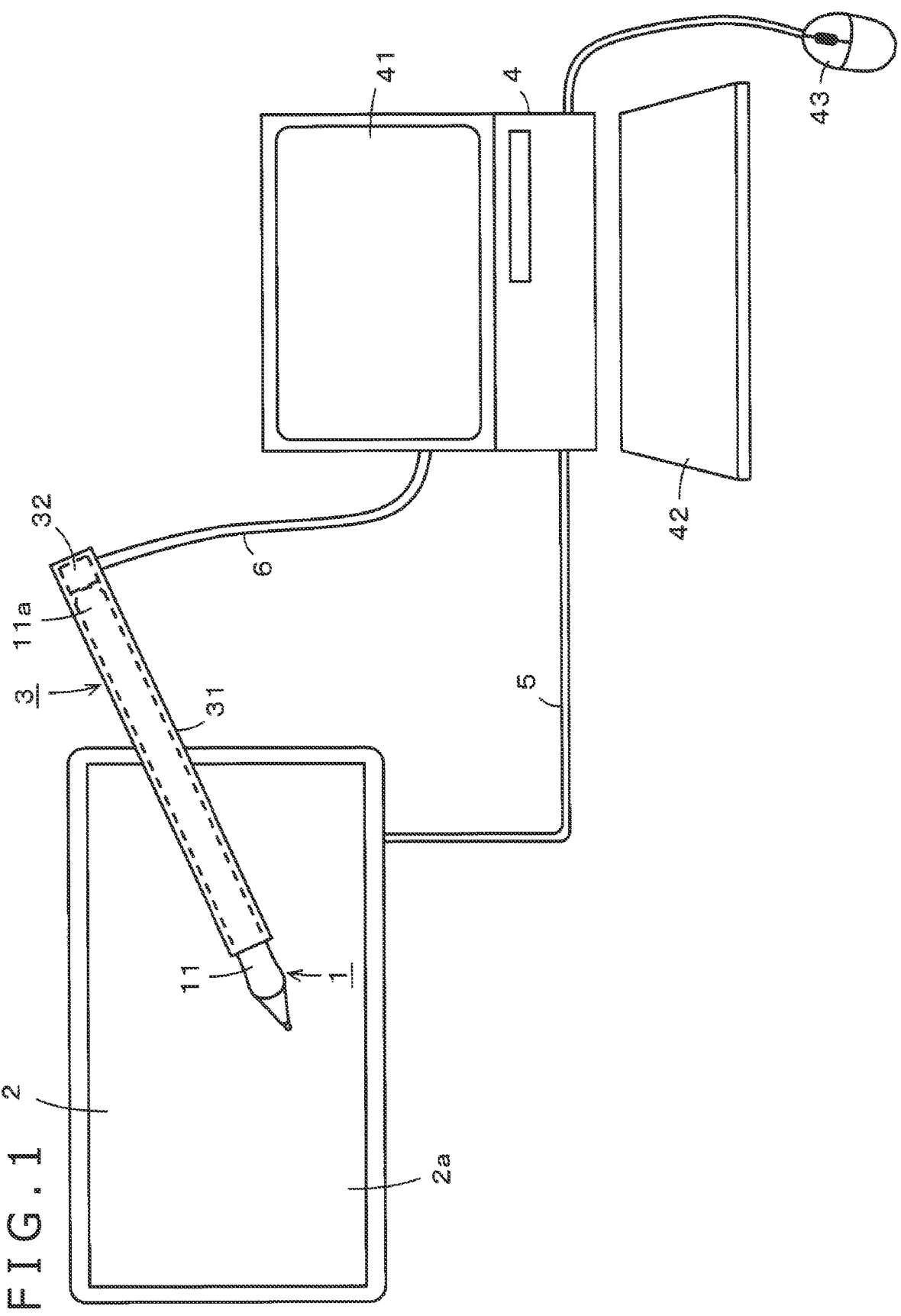
F I G . 1

F I G . 4
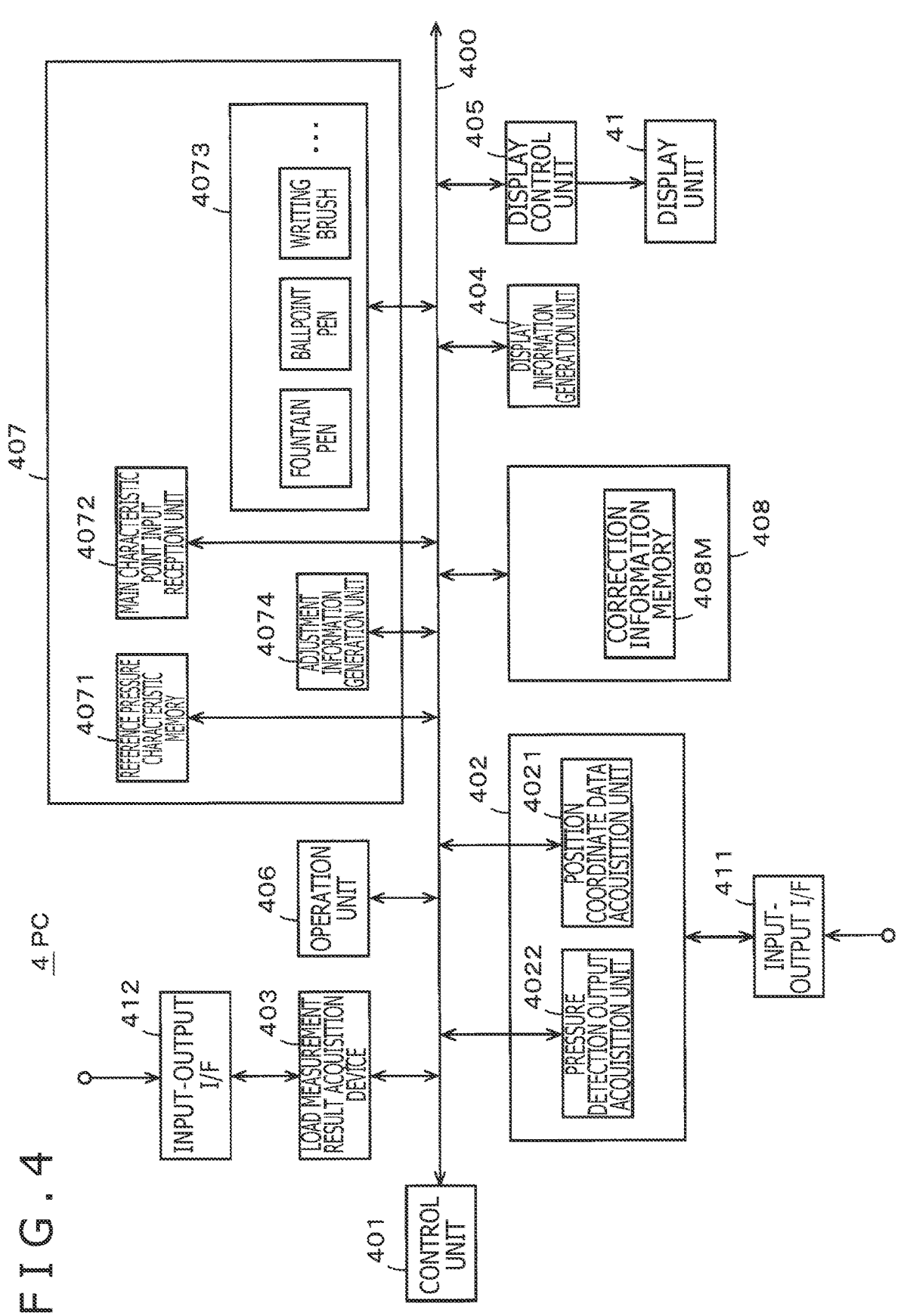

F I G . 7
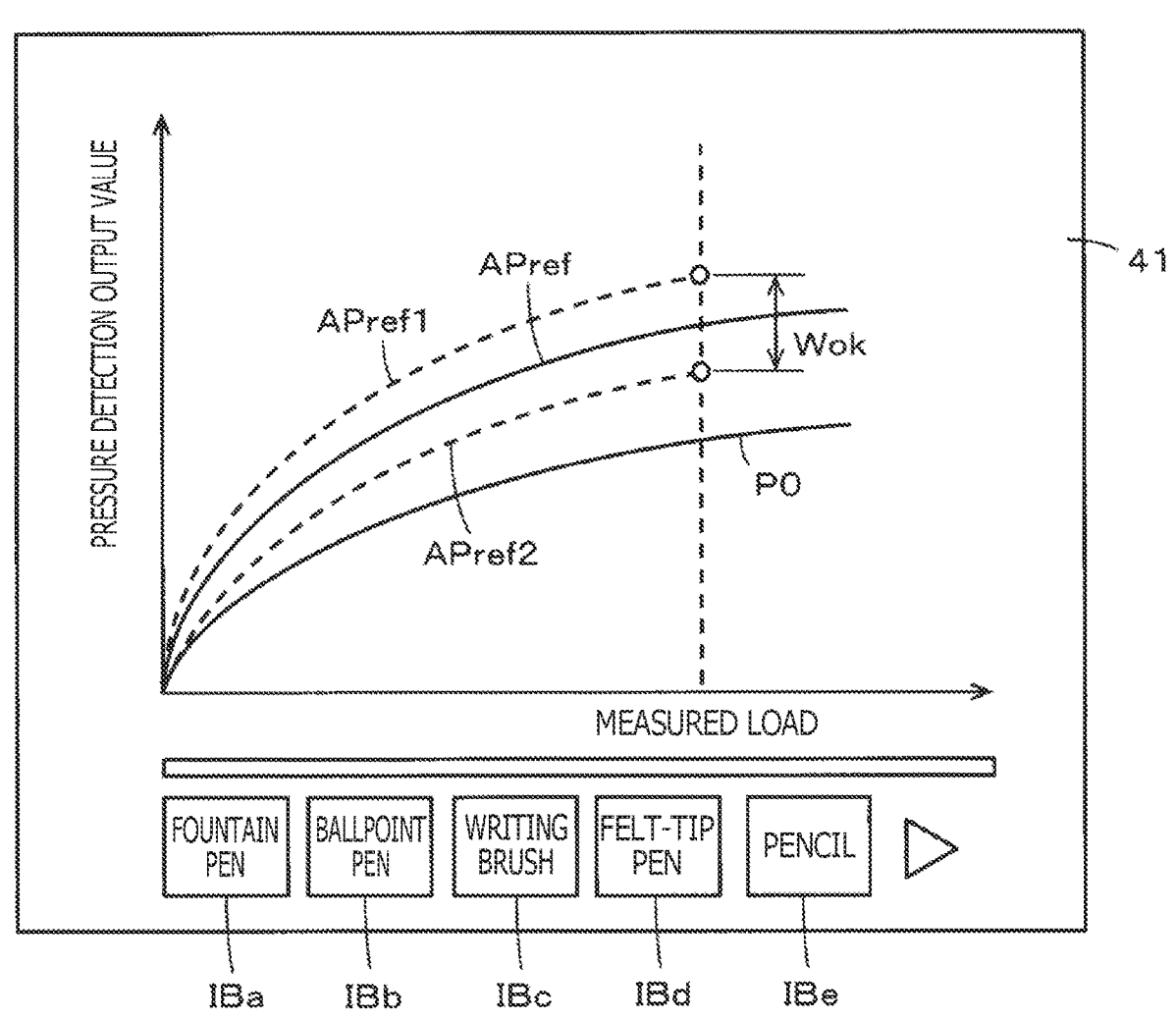

FIG.11

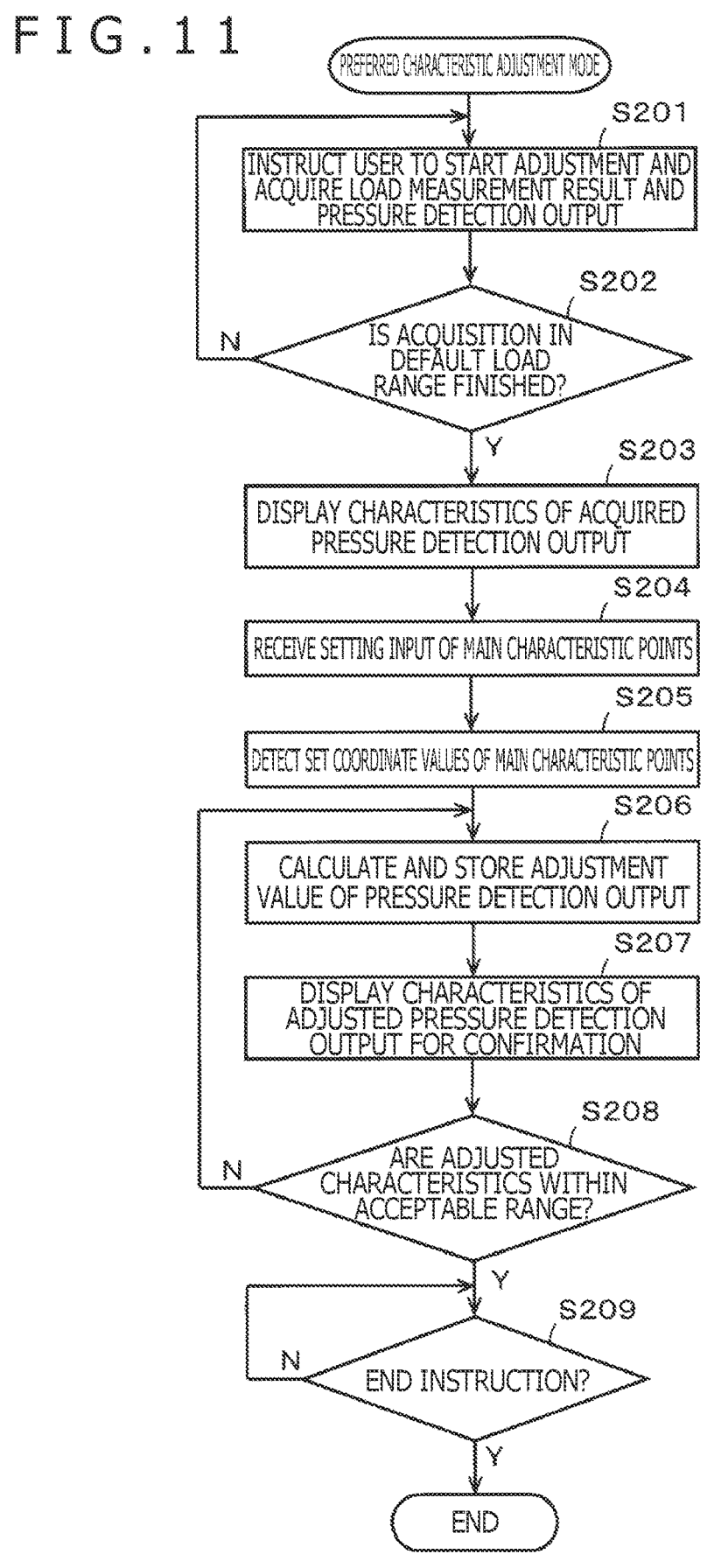

PREFERRED CHARACTERISTIC ADJUSTMENT MODE

S201
INSTRUCT USER TO START ADJUSTMENT AND ACQUIRE LOAD MEASUREMENT RESULT AND PRESSURE DETECTION OUTPUT

S202
IS ACQUISITION IN DEFAULT LOAD RANGE FINISHED?
N
Y

S203
DISPLAY CHARACTERISTICS OF ACQUIRED PRESSURE DETECTION OUTPUT

S204
RECEIVE SETTING INPUT OF MAIN CHARACTERISTIC POINTS

S205
DETECT SET COORDINATE VALUES OF MAIN CHARACTERISTIC POINTS

S206
CALCULATE AND STORE ADJUSTMENT VALUE OF PRESSURE DETECTION OUTPUT

S207
DISPLAY CHARACTERISTICS OF ADJUSTED PRESSURE DETECTION OUTPUT FOR CONFIRMATION

S208
ARE ADJUSTED CHARACTERISTICS WITHIN ACCEPTABLE RANGE?
N
Y

S209
END INSTRUCTION?
N
Y

END

Figure 1:
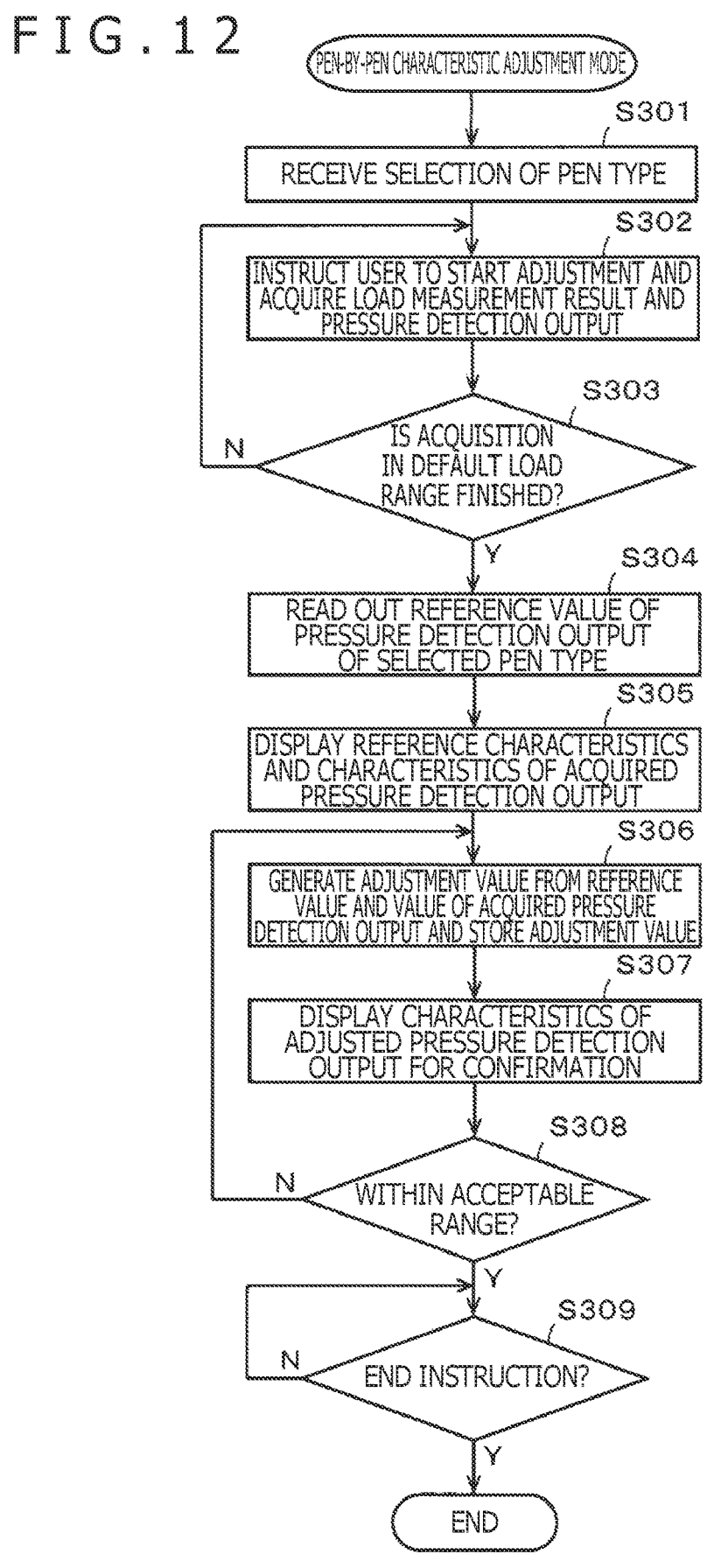

F I G . 1 2

( PEN-BY-PEN CHARACTERISTIC ADJUSTMENT MODE )

S301

RECEIVE SELECTION OF PEN TYPE

S302

INSTRUCT USER TO START ADJUSTMENT AND
ACQUIRE LOAD MEASUREMENT RESULT AND
PRESSURE DETECTION OUTPUT

S303

IS ACQUISITION
IN DEFAULT LOAD
RANGE FINISHED?

N

Y

S304

READ OUT REFERENCE VALUE OF
PRESSURE DETECTION OUTPUT
OF SELECTED PEN TYPE

S305

DISPLAY REFERENCE CHARACTERISTICS
AND CHARACTERISTICS OF ACQUIRED
PRESSURE DETECTION OUTPUT

S306

GENERATE ADJUSTMENT VALUE FROM REFERENCE
VALUE AND VALUE OF ACQUIRED PRESSURE
DETECTION OUTPUT AND STORE ADJUSTMENT VALUE

S307

DISPLAY CHARACTERISTICS OF
ADJUSTED PRESSURE DETECTION
OUTPUT FOR CONFIRMATION

S308

WITHIN ACCEPTABLE
RANGE?

N

Y

S309

END INSTRUCTION?

N

Y ( END )

CHARACTERISTIC ADJUSTMENT SYSTEM OF PRESSURE DETECTION OUTPUT AND CHARACTERISTIC ADJUSTMENT METHOD OF PRESSURE DETECTION OUTPUT

BACKGROUND

1. Technical Field

The present disclosure relates to a characteristic adjustment system of pressure detection output and a characteristic adjustment method of pressure detection output from a pressure detector that is included in an input tool brought into contact with an input surface to perform an input operation and that detects a pressure applied to a portion of the input tool in contact with the input surface.

2. Description of the Related Art

Various types of input tools brought into contact with an input surface to perform an input operation are provided. A position indicator used along with a position detection device including a position detection sensor is widely known as an example of this type of input tool. There are various types of position indicators, such as an electromagnetic coupling type and a capacitive coupling type, depending on the difference in the coupling type between the position indicator and the position detection sensor.

This type of position indicator indicates positions on the input surface (position detection area) of the position detection sensor and inputs the writing or drawing as a trajectory of the indicated positions. The position detection device detects the positions indicated by the position indicator in the position detection area corresponding to the input surface of the position detection sensor and generates writing data or drawing data as time-series data regarding the detected indicated positions.

This type of position indicator generally includes a pressure detector that detects the pressure applied to a portion of the position indicator in contact with the input surface. The pressure detector of the position indicator detects, as an electrical change, such as a change in capacitance, a change in inductance value, and a resistance change, the reaction force (pressure) generated when the contact portion of the position indicator is pressed against the input surface.

Known examples of the pressure detector that detects the pressure as a change in the capacitance include a pressure detector in which the capacitance changes when the contact area of a dielectric and a conductive elastic member changes according to the applied pressure (for example, see Japanese Patent Laid-Open No. 2016-126503 (hereinafter, Patent Document 1)) and a pressure detector including a semiconductor device in which the distance between two electrodes facing each other through an air layer as a dielectric changes according to the applied pressure (for example, see Japanese Patent Laid-Open No. 2013-161307 (hereinafter, Patent Document 2)).

There is also a known pressure detector that detects, as a change in inductance value, the displacement of a core body in the axial direction according to the applied pressure (for example, see Japanese Patent Laid-Open No. 2017-216002 (hereinafter, Patent Document 3)). There is also a known pressure detector that uses a strain gauge to detect, as a change in resistance value, the displacement of the core body in the axial direction according to the applied pressure (for example, see Japanese Patent Laid-Open No. 2019-016038 (hereinafter, Patent Document 4)).

The electrical change, such as a change in capacitance, a change in inductance value, and a resistance value, corresponding to the applied pressure detected by the pressure detector of the position indicator is transmitted to the position detection device. The position detection device generates pressure detection output based on information regarding the electrical change, such as a change in capacitance, a change in inductance value, and a resistance change, corresponding to the applied pressure received from the position indicator.

The position detection device transmits the generated pressure detection output to, for example, a host computer connected to the position detection device, along with the writing data and the drawing data. The host computer executes, for example, a process of displaying a display image on the display screen based on the received writing data and drawing data, detecting the contact of the position indicator with the input surface of the position detection sensor from the received pressure detection output, and changing the thickness of a line in the display image according to the magnitude of the pressure indicated in the pressure detection output. Note that there is also a case in which electronic equipment including the position detection device includes the display screen and has the function of the host computer.

As described above, the position detection device generates the pressure detection output (pen pressure detection output) according to an operation made by a user by bringing the position indicator into contact with the input surface of the position detection sensor and further applying a pressure (pen pressure) to the input surface to input an indication. When the user makes the indication input operation by use of the position indicator, the user has the feeling of operation corresponding to the characteristics of the pressure detection output. That is, the user feels that the feeling of operation of the position indicator is light if, for example, the pressure detection output is large even when the pressure applied to the contact portion of the position indicator and the input surface is small. On the other hand, the user feels that the feeling of operation of the position indicator is heavy if a large pressure detection output is not generated unless the pressure applied to the contact portion of the position indicator and the input surface is large. The magnitude of the pressure when the position indicator comes into contact with the input surface of the position detection sensor also affects the feeling of operation of the position indicator felt by the user. In general, the position indicator is adjusted to have predetermined characteristics that can present a predetermined feeling of operation determined by the manufacturer before the factory shipment, and the position indicator is sold on the market. Such adjustment is performed by adjusting an adjustment part or portion among the constituent parts of the position indicator.

The feeling of operation of the position indicator corresponding to the adjusted and set predetermined characteristics is based on an assumption that the position indicator is used by an average user, and the characteristics are not in line with the preferences of all users.

In view of this, electronic equipment (for example, tablet) including a position detection device is proposed, the electronic equipment including application software for adjusting the feeling of operation. However, the electronic equipment just allows the user to select whether to make the feeling of operation lighter or heavier with respect to the applied pressure (pen pressure). The characteristics cannot be adjusted according to a detailed request (desire) of the user, and the customizability is poor.

In addition, the characteristics of the pressure detection output generated by the position detection device may be deviated from the predetermined characteristics adjusted at the factory shipment, due to aging caused by long time use of the pressure detector of the position indicator. In such a case, when the position indicator with the characteristics of pressure detection output deviated from the predetermined characteristics due to long time use is changed to a new position indicator (including the pressure detector with the predetermined characteristics), the user may feel uncomfortable because of the difference in the feeling of operation. To prevent this, when the characteristics of the pressure detection output generated by the position detection device based on the output from the pressure detector of the position indicator are deviated from the predetermined characteristics, the pressure detection output with the deviated characteristics should be corrected and adjusted to exhibit the predetermined characteristics. However, there is conventionally no method for the user to adjust the pressure detection output.

BRIEF SUMMARY

Embodiments of the present disclosure provide a characteristic adjustment system of pressure detection output and a characteristic adjustment method of pressure detection output that can solve the problems.

To solve the problems, provided is a characteristic adjustment system of pressure detection output including an input tool that, in operation, performs an input operation by being brought into contact with an input surface and that includes a pressure detector that, in operation, detects a pressure applied to a portion of the input tool in contact with the input surface, a detection device that, in operation, generates pressure detection output by acquiring information regarding the pressure detected by the pressure detector of the input tool, a load measurement device that, in operation, measures a load applied to the input tool, and an adjustment device that, in operation, adjusts the pressure detection output from the detection device such that the pressure detection output has characteristics in a predetermined relation to a load measurement result from the load measurement device, based on the load measurement result from the load measurement device and the pressure detection output from the detection device in a state in which the load measured by the load measurement device is applied to the input tool.

According to the characteristic adjustment system of pressure detection output configured as described above, the load measurement device measures the load applied to the input tool. The adjustment device adjusts the pressure detection output from the detection device such that the pressure detection output has the characteristics in the predetermined relation to the load measurement result from the load measurement device, based on the load measurement result detected by the load measurement device and the pressure detection output from the detection device in the state in which the load measured by the load measurement device is applied to the input tool.

In the system, with the measured value of the load applied to the input tool, which is measured by the load measurement device, as reference, the pressure detection output upon the application of the load can be adjusted to a predetermined value. Therefore, the characteristics of the pressure detector of the input tool can be customized according to the request of the user.

BRIEF DESCRIPTION OF THE SEVERAL VIEWS OF THE DRAWINGS

FIG. 1 is a diagram for describing a configuration example of a characteristic adjustment system of pressure detection output according to an embodiment of the present disclosure;

FIG. 4 is a diagram for describing a configuration example of an information processing device as an example of an adjustment device in the characteristic adjustment system of pressure detection output according to the embodiment of the present disclosure;

FIG. 7 is a characteristic diagram for describing an example of the adjustment mode in the example of the adjustment device in the characteristic adjustment system of pressure detection output according to the embodiment of the present disclosure;

FIG. 11 depicts a flow chart for describing an operation in an example of the adjustment device in the characteristic adjustment system of pressure detection output according to the embodiment of the present disclosure; and FIG. 12 depicts a flow chart for describing an operation in an example of the adjustment device in the characteristic adjustment system of pressure detection output according to the embodiment of the present disclosure.

DETAILED DESCRIPTION

Figures 2A, 2B:
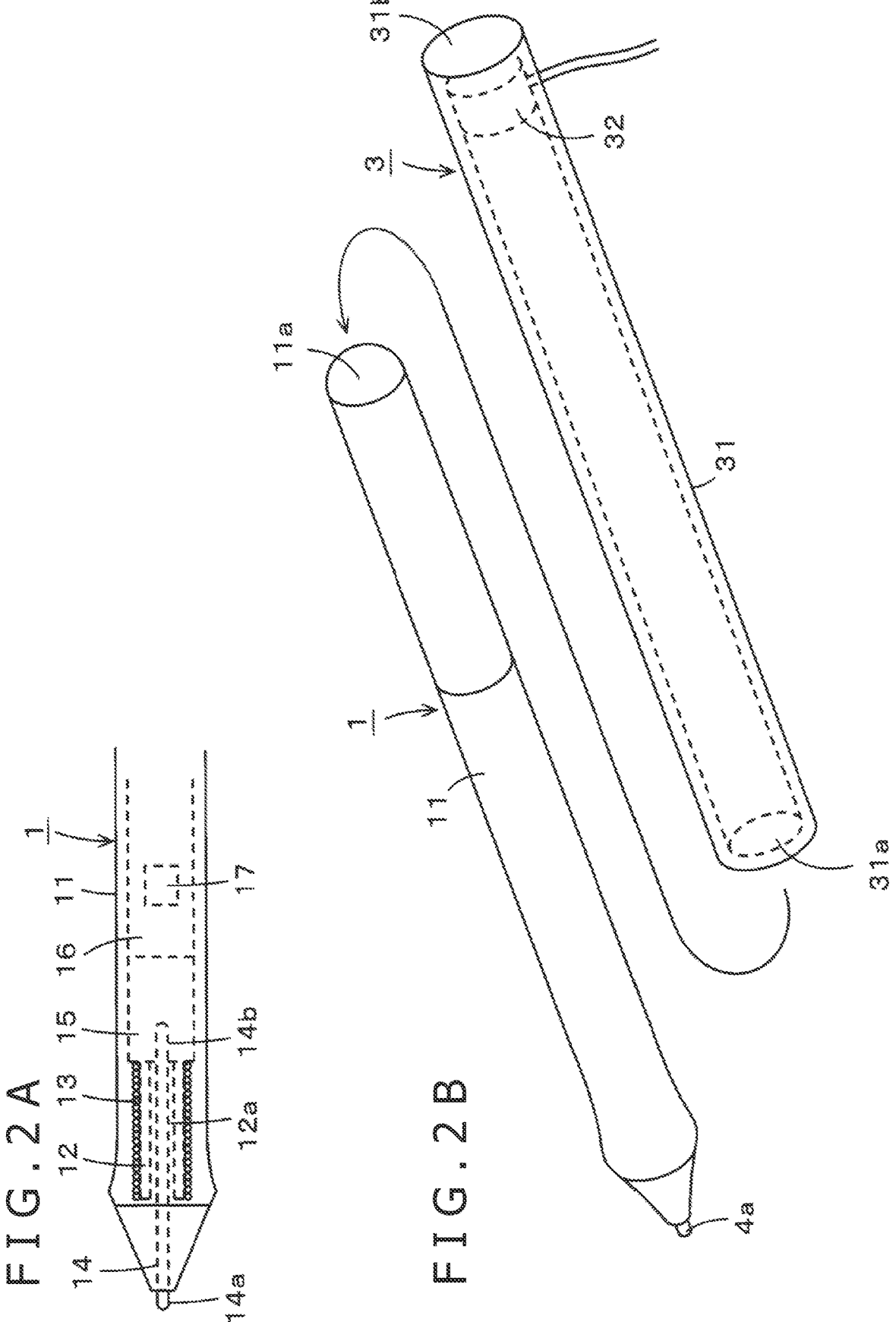
FIGS. 2A and 2B are diagrams for describing a configuration example of an electronic pen as an example of an input tool in the characteristic adjustment system of pressure detection output according to the embodiment of the present disclosure.

A characteristic adjustment system of pressure detection output according to an embodiment of the present disclosure will be described below with reference to the drawings.

FIG. 1 illustrates a configuration example of the characteristic adjustment system of pressure detection output according to the embodiment. In the characteristic adjustment system of pressure detection output according to the embodiment, an input tool is a position indicator, such as an electronic pen 1, and a detection device is a tablet 2 including a position detection device including a position detection sensor that detects the position indicated by the electronic pen 1. A load measurement device is a load measurement instrument 3 with a pencil case shape that is attached to the electronic pen 1 and that measures the load applied to the electronic pen 1. Further, an adjustment device is an information processing device separate from the tablet 2. In the example, the adjustment device is a personal computer (hereinafter, referred to as a PC) 4.

The PC 4 includes a display unit 41 and includes, for example, a keyboard 42 and a mouse 43 as operation input units. In the example, the tablet 2 and the load measurement instrument 3 are connected to the PC 4 through connection cables 5 and 6 such as universal serial bus (USB) cables.

Configuration Example of Electronic Pen 1 and Tablet 2

The electronic pen 1 and the position detection device of the tablet 2 in the embodiment are of an electromagnetic resonance type. The electronic pen 1 in the embodiment includes a pen-shaped cylindrical housing 11, and the body of the electronic pen 1 is housed in a hollow portion of the housing 11 as illustrated in FIGS. 1, 2A, and 2B. A coil 13 wound around a magnetic core, such a ferrite core 12, is provided on the pen tip side of the electronic pen 1 in the example as illustrated in FIG. 2A.

As illustrated in FIG. 2A, a pressure detector 15 is provided in the hollow portion of the housing 11 on the back end side of the ferrite core 12, which is the side opposite to the pen tip side. and a printed board 16 is provided on the back end side of the pressure detector 15. The printed board 16 is provided with a capacitor 17 that is connected in parallel to the coil 13 and that is included in a resonant circuit.

The ferrite core 12 is provided with a through hole 12a in the axial direction, and the ferrite core 12 is housed in the housing 11 such that the through hole 12a coincides with the position of an opening on the pen tip side of the housing 11. A rod-shaped core body 14 containing, for example, a resin is inserted through the opening on the pen tip side of the housing 11 and the through hole 12a of the ferrite core 12, and an end portion 14b of the core body 14 on the side opposite to a pen tip portion 14a thereof is fitted to the pressure detector 15. In the fitted state, the pen tip portion 14a of the core body 14 protrudes from the opening of the housing 11.

Therefore, when the electronic pen 1 in this example indicates a position on an input surface 2a of the tablet 2, the pen tip portion 14a of the core body 14 is in contact with the input surface 2a. When the user presses the electronic pen 1 against the input surface 2a, pressure (pen pressure) as reaction force of the press is applied to the pen tip portion 14a of the core body 14, and the applied pressure is transmitted to and detected by the pressure detector 15.

The pressure detector 15 in the example is configured to detect the pressure as a change in the capacitance, as disclosed in Patent Document 1 and Patent Document 2 described at the beginning. That is, the pressure detector 15 in the example includes a variable capacitor with the capacitance corresponding to the applied pressure. In the example, the variable capacitor included in the pressure detector 15 is part of a resonant circuit. The resonant frequency of the resonant circuit changes according to the capacitance of the variable capacitor.

In the example, signals are transmitted and received (interaction) to and from the position detection device of the tablet 2 through the resonant circuit of the electronic pen 1, and the position detection device detects the position indicated by the pen tip portion 14a of the core body 14 of the electronic pen 1 and detects the pressure applied to the pen tip portion 14a of the core body 14.

Figure 3:
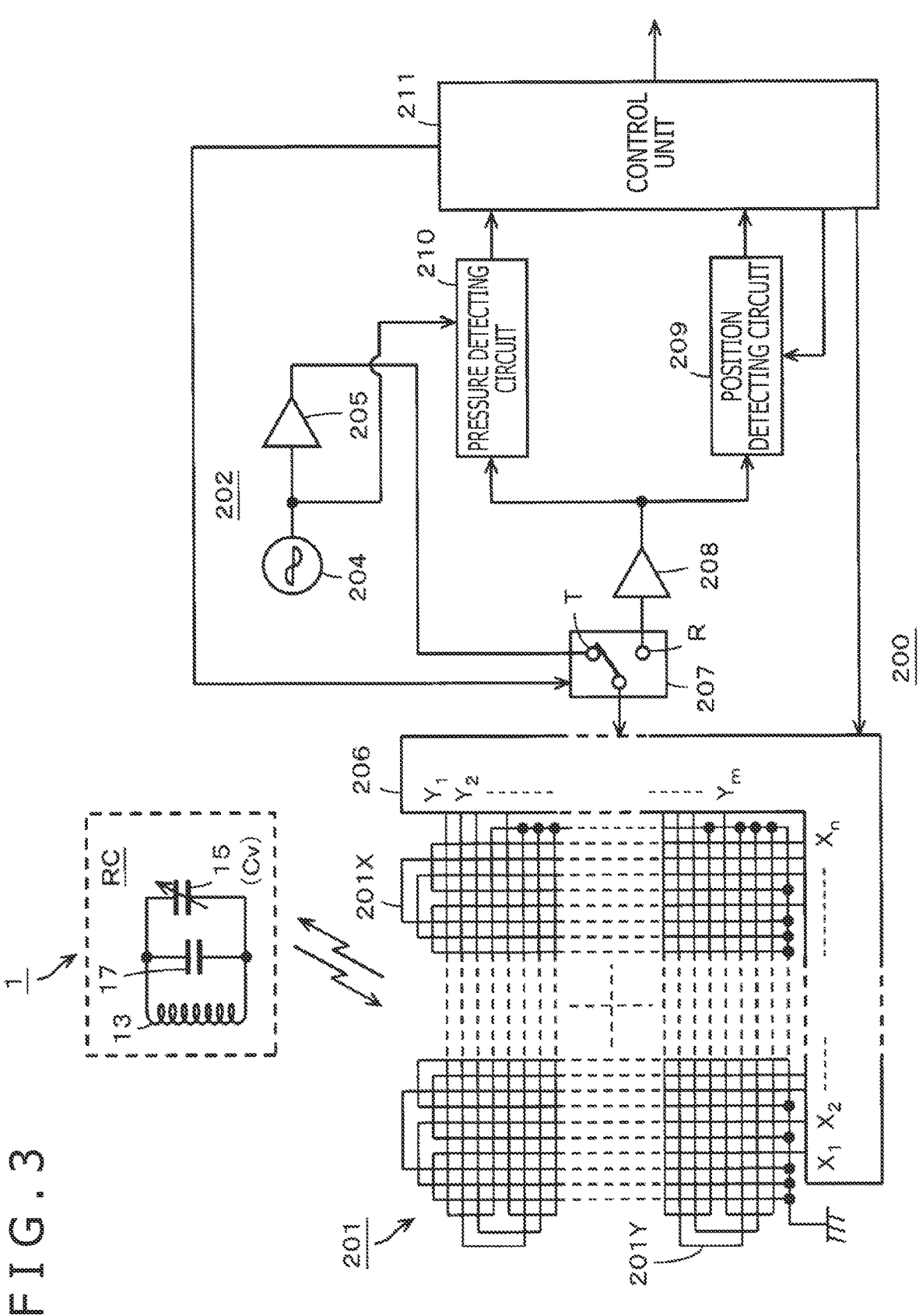
FIG. 3 is a diagram for describing a configuration example of a position detection device as an example of a detection device in the characteristic adjustment system of pressure detection output according to the embodiment of the present disclosure.

FIG. 3 depicts an example of electrical configuration for the interaction between the electronic pen 1 and the position detection device.

That is, the electronic pen 1 includes a resonant circuit RC1 in which the coil 13, the capacitor 17, and a variable capacitor Cv including the pressure detector 15 are connected in parallel. A position detection device 200 of the tablet 2 includes a position detection sensor 201 and a position detection circuit 202. The position detection sensor 201 includes layers of an X-axis direction loop coil group 201X and a Y-axis direction loop coil group 201Y.

The position detection circuit 202 includes an oscillator 204, a current driver 205, a selection circuit 206, a switch connection circuit 207, a reception amplifier 208, a position detecting circuit 209, a pressure detecting circuit 210, and a control unit 211. The control unit 211 includes a microprocessor. The control unit 211 controls the selection of a loop coil in the selection circuit 206 and the switching of the switch connection circuit 207 and also controls the process timing in the position detecting circuit 209 and the pressure detecting circuit 210.

The X-axis direction loop coil group 201X and the Y-axis direction loop coil group 201Y of the position detection sensor 201 are connected to the selection circuit 206. The selection circuit 206 sequentially selects one loop coil from the two loop coil groups 201X and 201Y. The oscillator 204 generates an alternating current (AC) signal with a frequency f0. The oscillator 204 supplies the generated AC signal to the current driver 205 and the pressure detecting circuit 210. The current driver 205 converts the AC signal supplied from the oscillator 204 into a current and sends out the current to the switch connection circuit 207.

The switch connection circuit 207 switches between connection points (transmission side terminal T and reception side terminal R) of the loop coil selected by the selection circuit 206, under the control of the control unit 211. As for the connection points, the current driver 205 is connected to the transmission side terminal T, and the reception amplifier 208 is connected to the reception side terminal R. The switch connection circuit 207 is switched to the terminal T side to transmit a signal from the position detection sensor 201. On the other hand, the switch connection circuit 207 is switched to the terminal R side when the position detection sensor 201 receives a signal from the outside.

When the switch connection circuit 207 is switched to the terminal T side, the current from the current driver 205 is supplied to the loop coil selected by the selection circuit 206. As a result, a magnetic field is generated in the loop coil, and a signal (radio wave) which will act on the resonant circuit RC of the electronic pen 1 facing the loop coil can be transmitted.

On the other hand, when the switch connection circuit 207 is switched to the terminal R side, an induced voltage generated in the loop coil selected by the selection circuit 206 is transmitted to the reception amplifier 208 through the selection circuit 206 and the switch connection circuit 207. The reception amplifier 208 amplifies the induced voltage supplied from the loop coil and sends out the induced voltage to the position detecting circuit 209 and the pressure detecting circuit 210.

That is, the induced voltage is generated by the radio wave transmitted (fed back) from the resonant circuit RC of the electronic pen 1, in each loop coil of the X-axis direction loop coil group 201X and the Y-axis direction loop coil group 201Y.

The position detecting circuit 209 detects the induced voltage, that is, the reception signal, generated in the loop coil, in relation to the component of the resonant frequency of the resonant circuit RC of the electronic pen 1. The position detecting circuit 209 converts the detected output signal into a digital signal and outputs the digital signal to the control unit 211.

The control unit 211 calculates coordinate values of the position in the X-axis direction and the Y-axis direction indicated by the pen tip portion 14a of the core body 14 of the electronic pen 1, based on the digital signal in relation to the resonant frequency component from the position detecting circuit 209, that is, based on each level of the voltage value of the induced voltage generated in each loop coil.

The pressure detecting circuit 210 uses the AC signal from the oscillator 204 to synchronously detect the reception signal from the reception amplifier 208. The pressure detecting circuit 210 detects the pressure (pen pressure) applied to the pen tip portion 14a of the core body 14 of the electronic pen 1, based on the frequency shift (phase difference) of both of the signals, to generate pressure detection output. Then, the pressure detecting circuit 210 outputs the pressure detection output to the control unit 211.

The control unit 211 transmits the information regarding the coordinate values of the detected position indicated by the electronic pen 1 and the pressure detection output (pen pressure value), to the PC 4 connected to the tablet 2 through the connection cable 5. In the PC 4, application software that processes the information from the tablet 2 displays the writing trace of the electronic pen 1 or the drawn image on the display screen based on the coordinate values of the position indicated by the electronic pen 1. In that case, the PC performs processing such that the pressure detection output is reflected in the thickness of the writing trace, the density of the drawn image, or the like.

Configuration Example of Load Measurement Instrument 3

The load measurement instrument 3 with a pencil case shape is attached to and covers the housing 11 of the electronic pen 1 except for a portion of the electronic pen 1 on the pen tip side as illustrated in FIGS. 1, 2A, and 2B. The load measurement instrument 3 includes a cylindrical body 31. The cylindrical body 31 has one end 31a in the axial direction with an opening formed therein and the other end 31b which is closed. A load detector 32 is provided on the closed end 31b side at a bottom of a hollow portion of the cylindrical body 31.

The load detector 32 includes, for example, a strain gauge in the example. The load detector 32 can detect the load applied in the axial direction of the cylindrical body 31 and output the load as a load measurement result. The load measurement result detected by the load detector 32 is transmitted to the PC 4 through the connection cable 6. Note that the load detector 32 may detect the load (pressure) as a change in the capacitance as disclosed in Patent Document 1 and Patent Document 2 described at the beginning or may detect the load (pressure) as a change in the inductance as disclosed in Patent Document 3.

As illustrated in FIGS. 1 and 2B, the inner diameter of the cylindrical body 31 of the load measurement instrument 3 is larger than the outer diameter of a portion of the housing 11 of the electronic pen 1 covered by the load measurement instrument 3. As illustrated in FIGS. 1 and 2B, the length in the axial direction of the cylindrical body 31 of the load measurement instrument 3 is shorter than the length in the axial direction of the housing 11 of the electronic pen 1.

The load measurement instrument 3 is attached to the electronic pen 1 such that the cylindrical body 31 covers the electronic pen 1 from the side of a back end portion 11a of the housing 11 as indicated by an arrow in FIG. 2B. When the load measurement instrument 3 is attached to the electronic pen 1, the electronic pen 1 can freely move in the axial direction in the hollow portion of the cylindrical body 31 of the load measurement instrument 3, and the back end portion 11a of the housing 11 of the electronic pen 1 is abutted to the load detector 32 in the cylindrical body 31 of the load measurement instrument 3 as illustrated in FIG. 1.

As illustrated in FIG. 1, when the user holds the cylindrical body 31 of the load measurement instrument 3 attached to the electronic pen 1, brings the pen tip portion 14a of the core body 14 of the electronic pen 1 into contact with the input surface 2a of the tablet 2, and then presses the pen tip portion 14a to apply a pressure to the pen tip portion 14a, the pressure applied to the pen tip portion 14a is transmitted to the pressure detector 15 of the electronic pen 1. Also, the entire housing 11 of the electronic pen 1 receives such a load that the housing 11 moves in the axial direction in the cylindrical body 31 of the load measurement instrument 3, and the load is transmitted to the load detector 32. Therefore, the pressure detector 15 of the electronic pen 1 detects the pressure applied to the pen tip portion 14a, and at the same time, the load detector 32 of the load measurement instrument 3 detects the load that is applied to the electronic pen 1 and that corresponds to the pressure applied to the pen tip portion 14a.

Then, in the position detection device 200 of the tablet 2, the pressure detecting circuit 210 generates the pressure detection output of the pressure applied to the pen tip portion 14a of the core body 14 of the electronic pen 1 and sends out the pressure detection output to the PC 4 through the connection cable 5 as described above. Further, the load measurement instrument 3 sends out the output of the load measurement result detected by the load detector 32 to the PC 4 through the connection cable 6.

Main Configuration Example of PC 4

In the present embodiment, the PC 4 is configured to adjust characteristics of the pressure detection output based on the pressure detection output acquired from the tablet 2 and the load measurement result acquired from the load measurement instrument 3. Note that an application program for adjusting the characteristics of the pressure detection output is installed in advance on the PC 4.

FIG. 4 illustrates a configuration example of constituent parts of the PC 4 for performing the function of adjusting the characteristics of the pressure detection output.

As illustrated in FIG. 4, the PC 4 includes a control unit 401 having a central processing unit (CPU) (e.g., processor) and a memory, and also includes a tablet output acquisition unit 402, a load measurement result acquisition device 403, a display information generation unit 404, a display control unit 405, an operation unit 406, an adjustment unit 407, and a pressure detection output correction unit 408 which are connected to the control unit 401 through a system bus 400. In one or more embodiments, the control unit 401 executes one or more programs that cause the control unit 401 to perform the functions of one or more of the tablet output acquisition unit 402, the load measurement result acquisition device 403, the display information generation unit 404, the display control unit 405, the operation unit 406, the adjustment unit 407, and the pressure detection output correction unit 408.

The control unit 401 stores, in a built-in memory, an application program for adjusting the characteristics of the pressure detection output and other control programs. The control unit 401 controls a process of adjusting the characteristics of the pressure detection output as described later, controls the display on the display screen of the PC 4, and performs other control.

The tablet output acquisition unit 402 acquires the tablet output transmitted from the tablet 2 through an input-output interface 411. The tablet output includes the data regarding the position coordinates indicated and input by the pen tip portion 14a of the core body 14 of the electronic pen 1 and the pressure detection output of the pressure applied to the pen tip portion 14a, as described above. The tablet output acquisition unit 402 has a function of separating the acquired tablet output into the position coordinate data and the pressure detection output. The position coordinate data is held in a position coordinate data acquisition unit 4021, and the pressure detection output is held in a pressure detection output acquisition unit 4022. Each of the position coordinate data acquisition unit 4021 and the pressure detection output acquisition unit 4022 includes a data holding buffer memory.

The load measurement result acquisition device 403 acquires and holds the load measurement result transmitted from the load measurement instrument 3 through an input-output interface 412. The load measurement result acquisition device 403 includes a data holding buffer memory.

The display information generation unit 404 generates display information to be displayed on the display screen of the display unit 41 of the PC 4. The display information includes the writing trace or the drawn image based on the position indicated and input by the electronic pen 1 in the input area of the position detection sensor and includes information regarding an adjustment display screen in an adjustment mode of the pressure detection output as described later.

The display control unit 405 performs control to display the display information generated by the display information generation unit 404, on the display screen of the display unit 41.

The operation unit 406 is configured to receive the operation input by the user. The operation unit 406 includes the keyboard 42, the mouse 43, and the like illustrated in FIG. 1 and also includes a functional unit of a touch panel arranged and placed over the display screen of the display unit 41. The control unit 401 has a function of detecting the type of operation indicated in the operation input information input by the user through the operation unit 406.

The adjustment unit 407 uses the load measurement result from the load measurement instrument 3 to adjust the characteristics of the pressure detection output generated by the position detection device 200 of the tablet 2 based on the detection information from the pressure detector 15 of the electronic pen 1, and generates adjustment information regarding the characteristics. In the embodiment, the adjustment unit 407 includes a reference pressure characteristic memory 4071, a main characteristic point input reception unit 4072, a pen-by-pen reference pressure characteristic memory 4073, and an adjustment information generation unit 4074. The adjustment information generation unit 4074 includes a buffer memory that stores an adjustment value of each measured load value. In the embodiment, the adjustment unit 407 has three adjustment modes as described below.

A first adjustment mode is a reference characteristic adjustment mode. In the reference characteristic adjustment mode, when the characteristics of the pressure detection output are deviated from the reference characteristics (ideal characteristics) at factory shipment due to aging caused by long time use of the electronic pen 1, the deviated characteristics of the pressure detection output are adjusted in line with reference characteristics (ideal characteristics). The adjustment unit 407 uses the reference pressure characteristic memory 4071 and the adjustment information generation unit 4074 in the reference characteristic adjustment mode.

Figure 5:
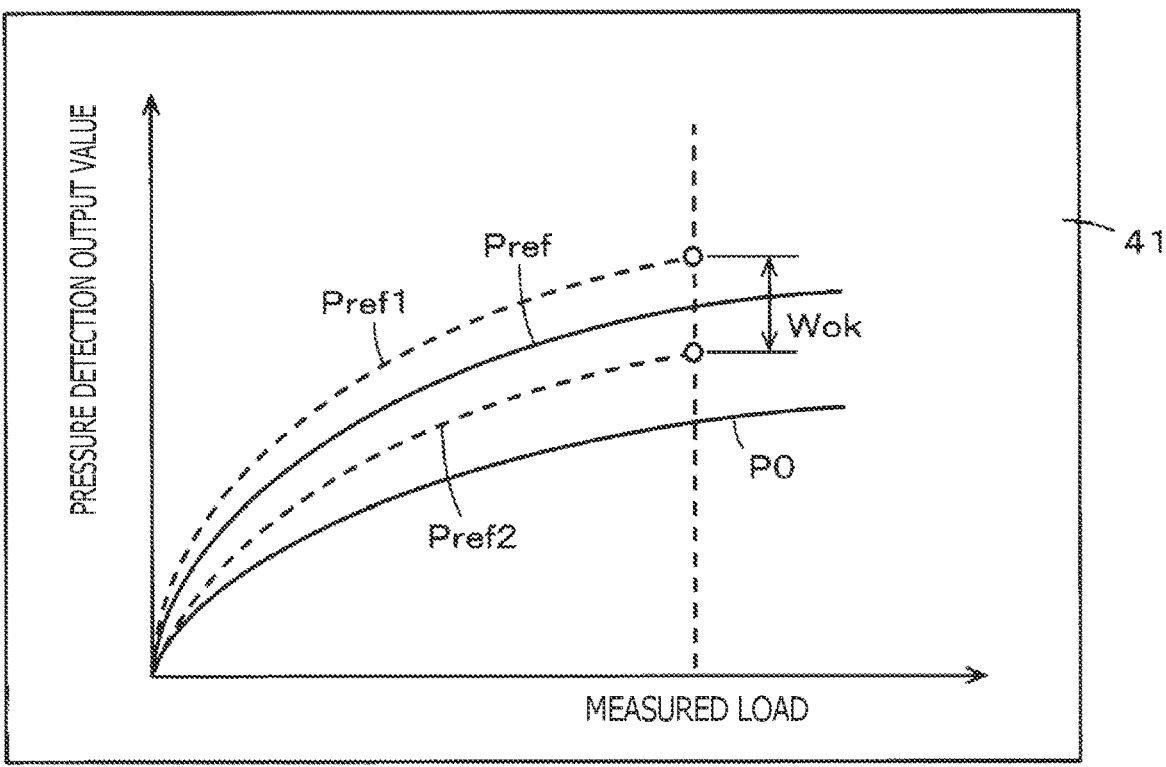
FIG. 5 depicts a characteristic diagram for describing an example of the adjustment device in the characteristic adjustment system of pressure detection output according to the embodiment of the present disclosure.

FIG. 5 is a characteristic diagram for describing the reference characteristic adjustment mode. The characteristic diagram is also displayed on the display screen of the display unit 41. The adjustment unit 407 in the embodiment displays a characteristic curve of the pressure detection output in a two-dimensional coordinate space, in which the horizontal axis represents the measured load, and the vertical axis represents the pressure detection output value of the tablet 2.

In the reference characteristic adjustment mode, the adjustment unit 407 adjusts a characteristic curve P0 of the pressure detection output value from the tablet 2, to a curve within an acceptable range Wok relative to a curve of the reference characteristics (ideal characteristics) as indicated by a curve Pref in FIG. 5 in the two-dimensional coordinate space as illustrated in FIG. 5.

That is, the adjustment information generation unit 4074 of the adjustment unit 407 in the reference characteristic adjustment mode generates an adjustment value to be added to (or subtracted from) the pressure detection output value from the tablet 2 at each load value such that the characteristic curve P0 of the pressure detection output value from the tablet 2 falls between a curve Pref1 of the upper limit of the reference characteristics and a curve Pref2 of the lower limit of the reference characteristics in FIG. 5. The adjustment unit 407 stores and holds the generated adjustment value of each load value. The information regarding the curve Pref1 of the upper limit of the reference characteristics and the curve Pref2 of the lower limit is stored and held in the reference pressure characteristic memory 4071, and the information is used to perform automatic adjustment in the example.

In the reference characteristic adjustment mode, the adjustment unit 407 transfers the information regarding the characteristic curve P0 of the pressure detection output value from the tablet 2, the reference characteristic curve Pref, and the adjusted characteristic curve (not illustrated in FIG. 5) to the display information generation unit 404 to display the characteristic curves on the display screen of the display unit 41.

A second adjustment mode is a preferred characteristic adjustment mode of allowing a user to adjust the characteristics of the pressure detection output according to his or her preference. The adjustment unit 407 uses the main characteristic point input reception unit 4072 and the adjustment information generation unit 4074 in the preferred characteristic adjustment mode.

Figure 6:
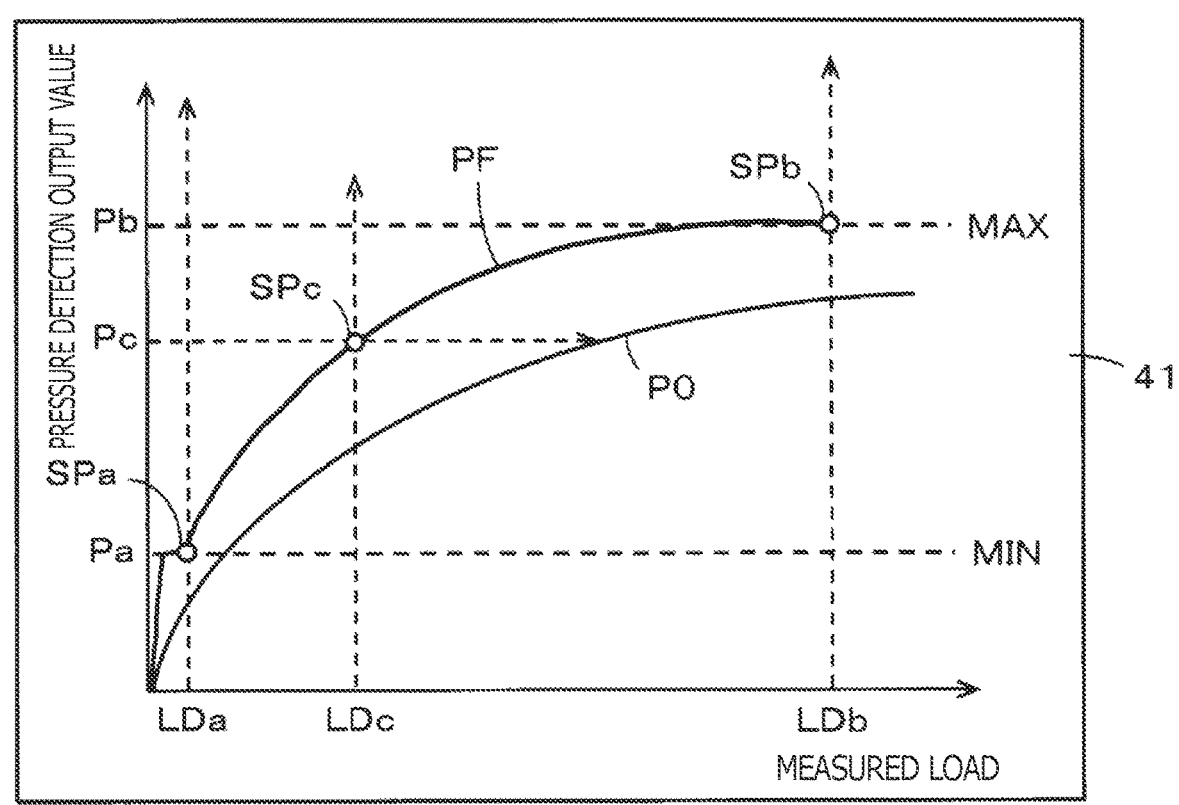
FIG. 6 is a characteristic diagram for describing an example of an adjustment mode in the example of the adjustment device in the characteristic adjustment system of pressure detection output according to the embodiment of the present disclosure.

FIG. 6 is a characteristic diagram for describing the preferred characteristic adjustment mode. The characteristic diagram is also displayed on the display screen of the display unit 41. In the preferred characteristic adjustment mode, the main characteristic point input reception unit 4072 of the adjustment unit 407 receives, from the user, a setting of a plurality of points as pressure detection output values relative to predetermined load values in the two-dimensional coordinate space as illustrated in FIG. 6 and receives setting input of a curve Pf of the characteristics preferred by the user.

In the example of FIG. 6, the main characteristic point input reception unit 4072 receives setting input of three points. The three points includes a zero point SPa for detecting that the electronic pen 1 has come into contact with the input surface 2a of the tablet 2, a maximum point SPb that is the maximum value of the pressure detection output with respect to the load applied to the electronic pen 1, and an intermediate point SPc that is set between the zero point SPa and the maximum point SPb and that is for setting the curve shape of the preferred characteristic curve PF. Note that a plurality of intermediate points SPc may be set instead of one intermediate point SPc.

Note that the main specific points received by the main characteristic point input reception unit are set as coordinate values (equivalent to load values and pressure detection output values) in the two-dimensional coordinate space, in which the horizontal axis represents the measured load of the load measurement result, and the vertical axis represents the pressure detection output value of the tablet 2. In the example, the coordinate values of the zero point SPa, the maximum point SPb, and the intermediate point SPc are (LDa, Pa), (LDb, Pb), and (LDc Pc), respectively, as illustrated in FIG. 6.

In the preferred characteristic adjustment mode, the adjustment unit 407 transfers the information regarding the characteristic curve P0 of the pressure detection output value from the tablet 2, the coordinate values of the plurality of points received by the main characteristic point input reception unit 4072, and the adjusted characteristic curve (not illustrated in FIG. 6) to the display information generation unit 404 to display the characteristic curves on the display screen of the display unit 41.

A third adjustment mode is a pen-by-pen characteristic adjustment mode. In the pen-by-pen characteristic adjustment mode, the pen type of the electronic pen 1, such as a fountain pen, a ballpoint pen, a writing brush, a felt-tip pen, and a pencil, can be selected and set, and the characteristics are adjusted in line with default reference characteristics (ideal characteristics) of the selected pen type. The adjustment unit 407 uses the pen-by-pen reference pressure characteristic memory 4073 and the adjustment information generation unit 4074 in the pen-by-pen characteristic adjustment mode.

FIG. 7 is a diagram for describing the pen-by-pen characteristic adjustment mode, and illustrates a display image on the display screen of the display unit 41. As illustrated in FIG. 7, the characteristic curve P0 of the pressure detection output value from the tablet 2 and a reference characteristic curve APref of each pen type are displayed in the two-dimensional coordinate space, and a plurality of icon buttons IBa, IBb, IBc, IBd, IBe, . . . for selecting the pen type, such as a fountain pen, a ballpoint pen, a writing brush, a felt-tip pen, and a pencil, are displayed in the pen-by-pen characteristic adjustment mode. The user can select any one of the icon buttons IBa, IBb, IBc. IBd, IBe, . . . to adjust the pressure detection output from the tablet 2 to the reference characteristics set in advance for each selected pen type in the pen-by-pen characteristic adjustment mode.

That is, the adjustment unit 407 first receives the selection of the pen type made by the user in the reference characteristic adjustment mode. The reference characteristic curve APref of the default load or pressure detection output of each pen type, such as a fountain pen, a ballpoint pen, a writing brush, a felt-tip pen, and a pencil, is stored in the pen-by-pen reference pressure characteristic memory 4073 as illustrated in FIG. 4.

The adjustment information generation unit 4074 of the adjustment unit 407 generates an adjustment value to be added to (or subtracted from) the pressure detection output value from the tablet 2 at each load value such that the characteristic curve P0 of the pressure detection output value from the tablet 2 falls between a curve APref1 of the upper limit of the reference characteristic curve APref of the selected pen type and a curve APref2 of the lower limit in FIG. 7, as in the case of the reference characteristic adjustment mode. The adjustment information generation unit 4074 stores and holds the generated adjustment value of each load value.

In the pen-by-pen characteristic adjustment mode, the adjustment unit 407 also transfers the information regarding the characteristic curve P0 of the pressure detection output value from the tablet 2, the reference characteristic curve APref of each pen type, and the adjusted characteristic curve (not illustrated in FIG. 7) to the display information generation unit 404 to display the characteristic curves on the display screen of the display unit 41.

The adjustment information generated and held by the adjustment information generation unit 4074 is stored in a correction information memory 408M of the pressure detection output correction unit 408 in each of the reference characteristic adjustment mode, the preferred characteristic adjustment mode, and the pen-by-pen characteristic adjustment mode.

The pressure detection output correction unit 408 uses the correction information held in the correction information memory 408M, to execute a correction process of the pressure detection output acquired from the tablet 2. That is, a correction value (added value or subtracted value) of each value of the pressure detection output acquired from the tablet 2 is stored in the correction information memory 408M. The pressure detection output correction unit 408 uses, as an argument, each value of the pressure detection output acquired from the tablet 2, to read the correction value from the correction information memory 408M. The pressure detection output correction unit 408 adds or subtracts the read correction value to or from each value of the pressure detection output acquired from the tablet 2, to obtain the pressure detection output with the adjusted characteristics as described above.

Note that the pressure detection output with the adjusted characteristics for each value of the pressure detection output acquired from the tablet 2 may be stored in the correction information memory 408M, and each value of the pressure detection output acquired from the tablet 2 may be used as an argument to obtain the pressure detection output with the adjusted characteristics from the correction information memory 408M.

The PC 4 uses the pressure detection output with the adjusted characteristics corrected by the pressure detection output correction unit 408, to display the writing trace or the drawing based on the coordinate data regarding the position indicated by the electronic pen 1 and received from the tablet 2.

Adjustment Operation Example of Characteristics of Pressure Detection Output

A flow of the adjustment operation of the characteristics of the pressure detection output in the PC 4 will be described. The control unit 401 executes a program to execute the adjustment function of the adjustment unit 407 in the case described below.

Figure 8:
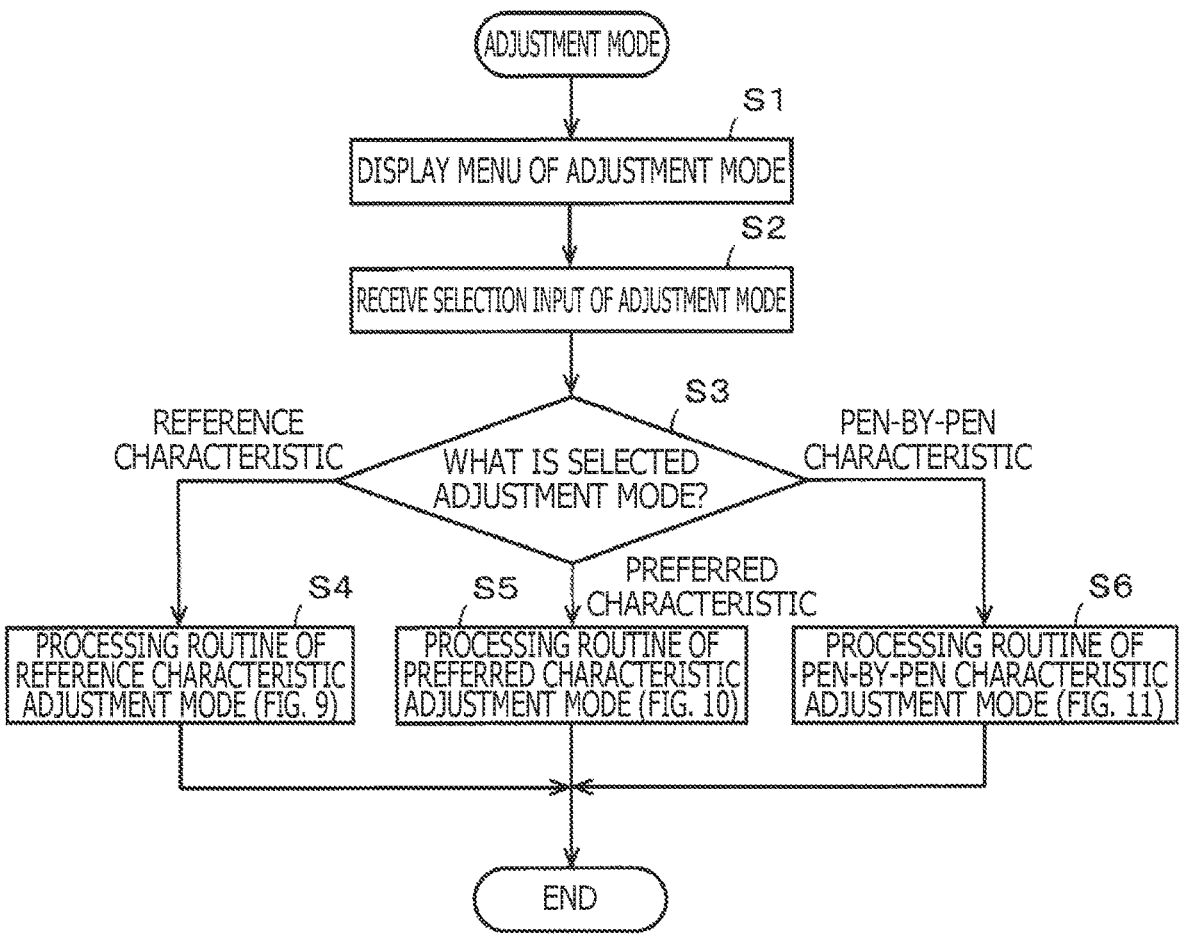
FIG. 8 is a flow chart for describing an operation in the example of the adjustment device in the characteristic adjustment system of pressure detection output according to the embodiment of the present disclosure.

In the embodiment, the control unit 401 in the PC 4 starts a process of the adjustment mode as illustrated in FIG. 8 when the activation of the adjustment mode is instructed through the operation unit 406.

The control unit 401 first displays a menu of the three adjustment modes on the display screen of the display unit 41 and prompts the user to select one of the adjustment modes (S1). The control unit 401 receives the selection input (S2). The control unit 401 determines which adjustment mode is selected (S3). When the control unit 401 determines that the reference characteristic adjustment mode is selected, the control unit 401 executes a processing routine of the reference characteristic adjustment mode (S4). When the control unit 401 determines that the preferred characteristic adjustment mode is selected, the control unit 401 executes a processing routine of the preferred characteristic adjustment mode (S5). When the control unit 401 determines that the pen-by-pen characteristic adjustment mode is selected, the control unit 401 executes a processing routine of the pen-by-pen characteristic adjustment mode (S6). The control unit 401 ends the adjustment mode when the execution of the processing routine of each adjustment mode is finished.

Figure 9:
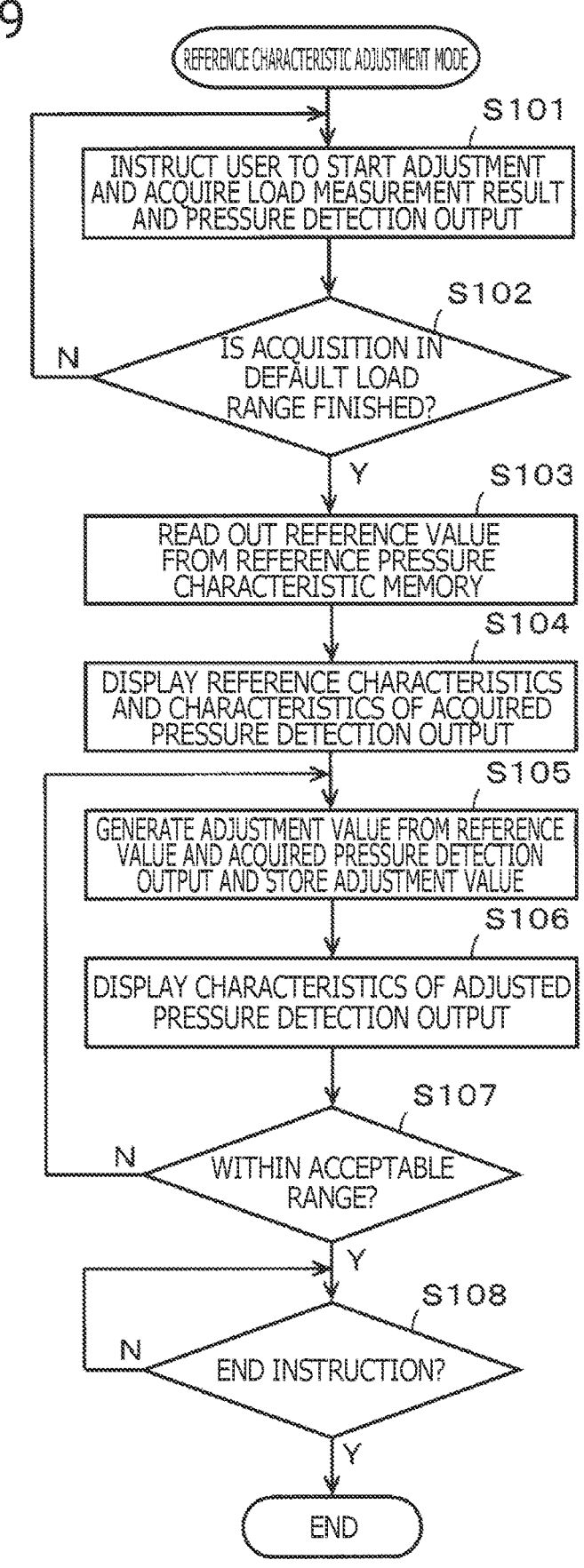
FIG. 9 depicts a flow chart for describing an operation in an example of the adjustment device in the characteristic adjustment system of pressure detection output according to the embodiment of the present disclosure.

Operation Example of Reference Characteristic Adjustment Mode (FIG. 9)

The processing routine of the reference characteristic adjustment mode at S4 of FIG. 8 will be described with reference to a flow chart of FIG. 9.

The control unit 401 instructs the user to start the adjustment and synchronously acquires a load Li (i=1, 2, 3, . . . ) of the load measurement result from the load measurement instrument 3 and pressure detection output Pi (i=1, 2, 3, . . . ) from the tablet 2 (S101). Here, the start of the adjustment is instructed by notifying the user of a message, such as "attach the load measurement instrument to the electronic pen, hold a portion of the load measurement instrument, and bring the pen tip of the electronic pen into contact with the input surface of the tablet to gradually apply pen pressure." through the display screen or voice.

When the user performs the operation as instructed, the load measurement instrument 3 measures the load applied to the electronic pen 1, and the information regarding the load measurement result is transmitted to the PC 4 through the connection cable 6. At the same time, the pressure detector 15 detects the pressure (pen pressure) applied to the pen tip portion 14a of the electronic pen 1, according to the load applied to the electronic pen 1. The information regarding the detected pressure is transmitted to the position detection device 200 through the position detection sensor 201 of the tablet 2 as described above, and the information is detected as the pressure detection output. The pressure detection output detected by the tablet 2 is transmitted to the PC 4 through the connection cable 5 along with the coordinate data regarding the position indicated by the electronic pen 1.

In the PC 4, the control unit 401 causes the functional units of the pressure detection output acquisition unit 4022 and the load measurement result acquisition device 403 to sequentially acquire the pressure detection output Pi from the tablet 2 and the load Li of the load measurement result from the load measurement instrument 3 at the same sampling timing and hold them in the respective buffer memories.

Next, the control unit 401 determines whether or not the acquisition of the pressure detection output Pi in a default load range of zero load to maximum load is finished (S102). When the acquisition is not finished, the control unit 401 returns to S101 and repeats the process of S101.

When the control unit 401 determines at S102 that the acquisition of the pressure detection output Pi in the default load range is finished, the control unit 401 reads out and acquires each reference value Prefj (j=1, 2, 3, . . . ) of the pressure detection output in the default load range from the reference pressure characteristic memory 4071 (S103).

The control unit 401 displays, on the display screen of the display unit 41, the curve representing the characteristics of the pressure detection output Pi from the tablet 2 acquired at S101 and the curve representing the reference pressure characteristics based on each reference value Prefj of the pressure detection output in the default load range acquired in S102 (S104).

Figure 10A:
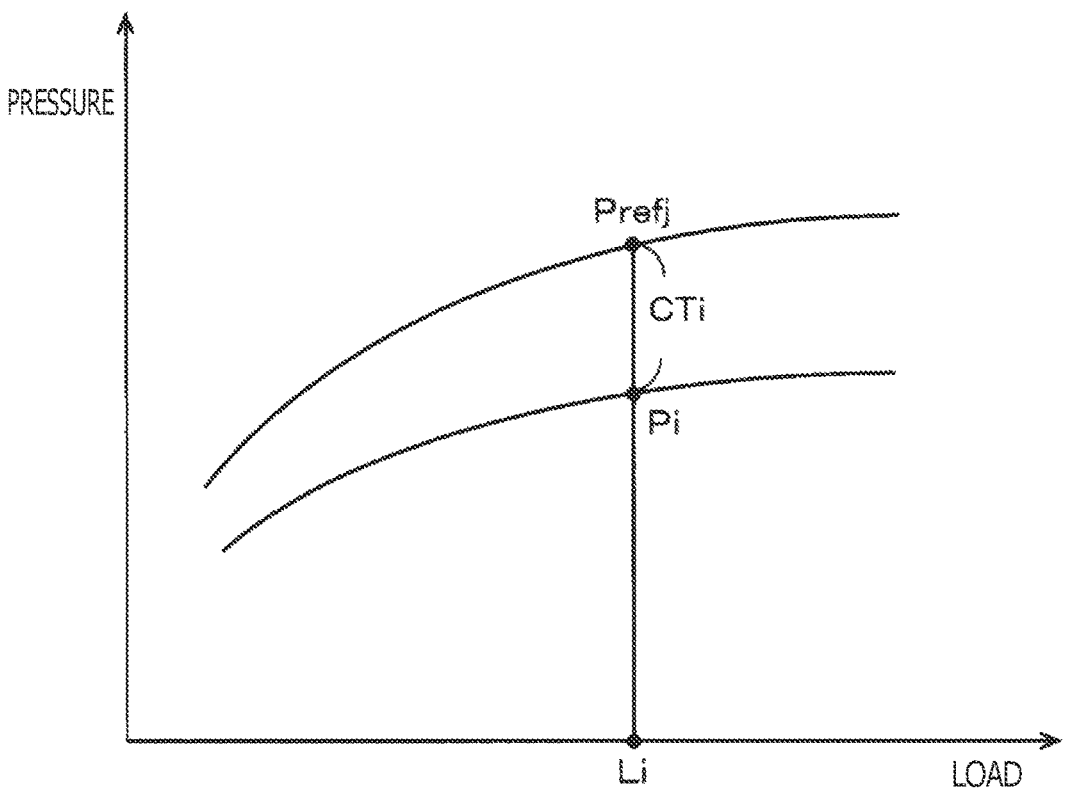
FIGS. 10A and 10B are diagrams used for describing an operation in an example of the adjustment device in the characteristic adjustment system of pressure detection output according to the embodiment of the present disclosure.

The control unit 401 obtains a difference value (including plus or minus sign) between each reference value Prefj of the pressure detection output acquired at S103 and corresponding pressure detection output Pi acquired at S101 and held in the buffer memory of the pressure detection output acquisition unit 4022, the reference value Prefj and the pressure detection output Pi corresponding to the same load value Li, to generate an adjustment value CTi for each pressure detection output Pi held in the buffer memory of the pressure detection output acquisition unit 4022 (see FIG. 10A). The control unit 401 stores and holds the generated adjustment value CTi in the buffer memory of the adjustment information generation unit 4074 in association with the pressure detection output value Pi at the corresponding load Li and transfers the adjustment value CTi to the pressure detection output correction unit 408 to store the adjustment value CTi in the correction information memory 408M (S105).

Note that each reference value Prefj at each predetermined load value, such as each gram, is stored in the reference pressure characteristic memory 4071. The load value Li measured by the load measurement instrument 3 at each pressure detection output Pi may not be equal to the load value corresponding to each reference value Prefj (see FIG. 10B).

Figure 10B:
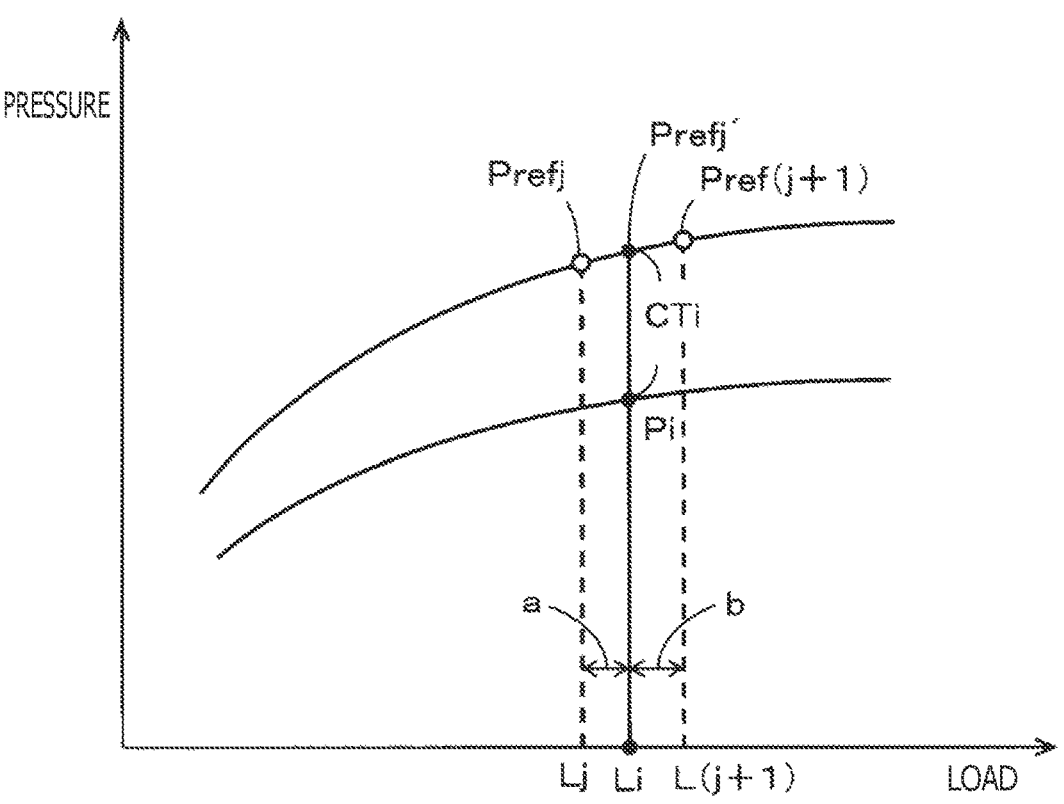

When the load value corresponding to each reference value Pref of the pressure detection output acquired at S102 and the load value Li corresponding to each pressure detection output value Pi held in the buffer memory of the pressure detection output acquisition unit 4022 are different at S105 as illustrated in FIG. 10B, an interpolation process is executed to obtain a reference value Prefj' corresponding to the load value Li corresponding to each pressure detection output value Pi.

That is, when reference values Prefj and Pref (j+1) corresponding to loads Lj and L(j+1) above and below the load Li can be obtained from the reference pressure characteristic memory 4071 in FIG. 10B, the interpolation value Prefj' of the reference value is calculated by $$\text{Prefj}' = (b \cdot \text{Prefj} + aL(j+1))/(a+b)$$

where a=Li−Lj, and b=L(j+1)−Li.

The adjustment value CTi is obtained as a difference (including plus or minus sign) between the reference value Prefj' calculated by the interpolation and the pressure detection output value Pi. Note that, instead of the difference value, the obtained difference value may be added to (or subtracted from) each pressure detection output Pi to generate an adjusted pressure detection output, and information of a conversion table for reading out each pressure detection output Pi as an argument may be stored in the buffer memory of the adjustment information generation unit 4074 and the correction information memory 408M of the pressure detection output correction unit 408 as described above. This similarly applies to the other adjustment modes described below.

The control unit 401 displays the reference characteristics of the pressure detection output Pref stored in the reference pressure characteristic memory 4071 and the characteristics of the pressure detection output Pi acquired by the pressure detection output acquisition unit 4022, as well as the characteristics of the adjusted pressure detection output, on the display screen of the display unit 41 for confirmation (S106).

The control unit 401 determines whether the characteristics of the adjusted pressure detection output are within the acceptable range (S107). When the control unit 401 determines that the characteristics are not within the acceptable range, the control unit 401 returns the process to S105 and repeats the process from S105. When the control unit 401 determines at S107 that the characteristics are within the acceptable range, the control unit 401 waits for an end instruction from the user (S108) and ends the processing routine of the reference characteristic adjustment mode.
Operation Example of Preferred Characteristic Adjustment Mode (FIG. 11)

Next, the processing routine of the preferred characteristic adjustment mode at S5 of FIG. 8 will be described with reference to a flow chart of FIG. 11.

As in the case of the reference characteristic adjustment mode, the control unit 401 instructs the user to start the adjustment and synchronously acquires the load Li of the load measurement result from the load measurement instrument 3 in the default load range of zero load to maximum load and the pressure detection output Pi from the tablet 2 (S201 and S202).

When the control unit 401 determines at S202 that the acquisition of the pressure detection output Pi in the default load range is finished, the control unit 401 displays the characteristic curve of the acquired pressure detection output Pi from the tablet 2 on the display screen of the display unit 41 (S203).

The control unit 401 receives the setting input of the plurality of main characteristic points, such as three main characteristic points SPa, SPb, and SPc, for obtaining the preferred characteristics described with reference to FIG. 6 (S204) and detects the coordinate values (load values and pressure detection output values) of the plurality of main characteristic points (S205).

Next, the control unit 401 calculates and generates, for each pressure detection output Pi corresponding to each load value Li, the adjustment value for the characteristic curve of the acquired pressure detection output Pi from the tablet 2 to go through the coordinate values of the set three main characteristic points SPa, SPb, and SPc, stores and holds the adjustment value in the buffer memory of the adjustment information generation unit 4074 in association with each pressure detection output Pi, and transfers the adjustment value to the pressure detection output correction unit 408 to store the adjustment value in the correction information memory 408M (S206).

The control unit 401 displays the characteristics of the pressure detection output Pi acquired by the pressure detection output acquisition unit 4022 and the characteristics of the adjusted pressure detection output on the display screen of the display unit 41 for confirmation (S207).

The control unit 401 then determines whether or not the characteristics of the adjusted pressure detection output are within the acceptable range (S208). When the control unit 401 determines that the characteristics are not within the acceptable range, the control unit 401 returns the process to S206 and repeats the process from S206. When the control unit 401 determines at S208 that the characteristics are within the acceptable range, the control unit 401 waits for an end instruction from the user (S209) and ends the processing routine of the preferred characteristic adjustment mode.
Operation Example of Pen-by-Pen Characteristic Adjustment Mode (FIG. 12)

Next, the processing routine of the pen-by-pen characteristic adjustment mode at S6 of FIG. 8 will be described with reference to a flow chart of FIG. 12.

The control unit 401 first displays a message for prompting the user to select and input the pen type on the display screen of the display unit 41 or uses voice to notify the user of the message. Then, the control unit 401 receives the selection of the pen type input by the user in response to the message (S301).

As in the case of the reference characteristic adjustment mode, the control unit 401 instructs the user to start the adjustment and synchronously acquires the load Li of the load measurement result from the load measurement instrument 3 in the default load range of zero load to maximum load and the pressure detection output Pi from the tablet 2 (S302 and S303).

When the control unit 401 determines at S303 that the acquisition of the pressure detection output Pi in the default load range is finished, the control unit 401 reads out and acquires each reference value Prefj of the pressure detection output in the default load range of the selected pen type from the pen-by-pen reference pressure characteristic memory 4073 (S304).

The control unit 401 then displays, on the display screen of the display unit 41, the curve representing the characteristics of the pressure detection output Pi from the tablet 2 acquired at S302 and the curve representing the reference pressure characteristics based on each reference value Prefj of the pressure detection output in the default load range of the selected pen type acquired at S304 (S305).

The control unit 401 obtains the difference value (including plus or minus sign) between each reference value Prefj of the pressure detection output of the selected pen type acquired at S304 and corresponding pressure detection output Pi acquired at S302 and held in the buffer memory of the pressure detection output acquisition unit 4022, the reference value Prefj and the pressure detection output Pi corresponding to the same load value Li, to generate the adjustment value for each pressure detection output Pi held in the buffer memory of the pressure detection output acquisition unit 4022. The control unit 401 stores and holds the adjustment value in the buffer memory of the adjustment information generation unit 4074 in association with each pressure detection output value Pi and transfers the adjustment value to the pressure detection output correction unit 408 to store the adjustment value in the correction information memory 408M (S306).

If the load value corresponding to each reference value Pref of the pressure detection output of the selected pen type acquired at S304 and the load value corresponding to each pressure detection output value Pi held in the buffer memory of the pressure detection output acquisition unit 4022 are different at S306, the reference pressure detection output value Pref held in the reference pressure characteristic memory 4071 is used to execute the interpolation process, to thereby obtain the reference value Pref' corresponding to the load value corresponding to each pressure detection output value Pi, as in the case of the reference characteristic adjustment mode.

Next, the control unit 401 displays the reference characteristic of the pressure detection output Pref of the selected pen type and the characteristics of the pressure detection output Pi acquired by the pressure detection output acquisition unit 4022, as well as the characteristics of the adjusted pressure detection output, on the display screen of the display unit 41 for confirmation (S307).

The control unit 401 then determines whether the characteristics of the adjusted pressure detection output are within the acceptable range (S308). When the control unit 401 determines that the characteristics are not within the acceptable range, the control unit 401 returns the process to S306 and repeats the process from S306. When the control unit 401 determines at S308 that the characteristics are within the acceptable range, the control unit 401 waits for an end instruction from the user (S309) and ends the processing routine of the pen-by-pen characteristic adjustment mode.

Advantageous Effects of Embodiment

In the characteristic adjustment system of pressure detection output according to the embodiment described above, the PC 4 can acquire the measured value of the load applied to the electronic pen 1, which is measured by the load measurement instrument 3 attached to the electronic pen 1, and can also acquire the pressure detection output of the pressure (pen pressure) in the tablet detected by the pressure detector 15 of the electronic pen 1 at each measured value of the measured load.

Therefore, the PC 4 can easily adjust, to predetermined characteristics, the pressure detection output from the tablet 2 corresponding to the measured value of the load applied to the electronic pen 1.

In the reference pressure characteristic adjustment mode of the PC 4, the PC 4 can adjust the pressure detection output from the tablet 2 corresponding to the load of the measured value, which is measured by the load measurement instrument 3, to the value of the pressure detection output of the reference characteristics set in advance.

In the preferred pressure characteristic adjustment mode of the PC 4, the values of the pressure detection output with respect to the plurality of values of the load of the measured value measured by the load measurement instrument 3 can be set to adjust the pressure detection output from the tablet 2 to the set values of the pressure detection output, and the pressure detection output can be adjusted to the characteristics preferred by the user. Therefore, the characteristics of the pressure detector of the input tool can be customized according to the request of the user.

In the pen-by-pen characteristic adjustment mode of the PC 4, the default reference characteristics of the pressure detection output for each pen type with respect to the load applied to the electronic pen 1 can be held, and the user can select the pen type. In this way, the pressure detection output from the tablet 2 can be adjusted to the characteristics of the pressure detection output of the pen type selected by the user.

Then, the PC 4 can use the adjustment information generated in each adjustment mode, to correct the pressure detection output from the tablet 2 to the characteristics of the pressure detection output adjusted in the adjustment mode.

Modifications of Embodiment

In the reference characteristic adjustment mode and the pen-by-pen characteristic adjustment mode of the embodiment, the pressure detection output from the tablet 2 is automatically adjusted in line with the reference characteristics (including the reference characteristics of each pen type) of the pressure detection output stored in advance, and the adjustment modes are then finished. Alternatively, after the automatic adjustment, the selection input of a plurality of main characteristic points may be received as in the preferred characteristic adjustment mode, to further adjust the pressure detection output as the user prefers.

Further, in each adjustment mode of the embodiment, the characteristic curve of the adjusted pressure detection output can be displayed and checked on the display screen of the display unit 41. However, this is not restrictive, and a test-writing area of another window may be further provided on the display screen to display and check the writing trace or the drawn image in the test-writing of the electronic pen with the characteristics of the adjusted pressure detection output.

According to the abovementioned embodiment, the electronic pen 1 with various characteristics of the pressure detection output can be realized. However, it is difficult to identify the type of electronic pen and the type of characteristics when the user possesses a plurality of electronic pens 1. This problem can be solved by configuring the electronic pen 1 such that identification (ID) information (pen ID) specific to each electronic pen 1 is transmittable to the tablet 2 or the PC 4 and such that table information regarding characteristics of the pressure detection output corresponding to each pen ID is stored in the tablet 2 or the PC 4 to allow identification of the characteristics of the pressure detection output for each electronic pen.

Although the tablet 2 and the load measurement instrument 3 are connected to the PC 4 through the connection cables 5 and 6 in the embodiment, it is obvious that they may wirelessly be connected to each other.

Further, although the PC 4 as an information processing device is provided separately from the tablet 2 in the embodiment, electronic equipment having the function of the tablet 2 and the function of the information processing device may be used. In that case, the system includes the electronic pen 1, the load measurement instrument 3, and the electronic equipment having the tablet function and the information processing device function.

Further, although the electronic pen 1 and the tablet 2 are of the electromagnetic resonance type in the embodiment, it is obvious that the embodiment can also be applied to the electronic pen 1 and the tablet 2 of capacitive coupling type.

Further, although the information detected by the pressure detector of the electronic pen is transmitted to the tablet through the interaction with the position detection sensor in the embodiment, a near field communication unit of, for example, Bluetooth (registered trademark) standard may be provided on both the electronic pen and the tablet to transmit the information through wireless communication.

Further, the pressure detector of the electronic pen 1 is not limited to the pressure detector that detects the pressure as a change in the capacitance as in the embodiment. The pressure detector may use a change in the inductance as in Patent Document 3, or the pressure detector may be as in Patent Document 4.

Further, the load measurement instrument is not limited to the load measurement instrument with a pencil case shape that is attached to the electronic pen as described above, and may be any load measurement instrument that can measure the load applied to the electronic pen.

OTHER EMBODIMENTS OR MODIFICATIONS

Although the embodiment provides the electronic pen 1 as an example of the input tool, the tablet 2 as an example of the detection device, the load measurement instrument 3 with a pencil case shape as an example of the load measurement device, and the PC 4 as an example of the adjustment device, the configuration is not limited to this.

That is, the input tool is not limited to the position indicator of the embodiment, and the input tool may be any input tool that is brought into contact with the input surface to perform the input operation and that includes the pressure detector configured to detect the pressure applied to the portion of the input tool in contact with the input surface. The detection device may be any detection device having the function of acquiring the information regarding the pressure detected by the pressure detector of the input tool, to generate the pressure detection output. The adjustment device may be a similar adjustment device having the function of acquiring the load measurement result from the load measurement device and the pressure detection output from the detection device and adjusting the pressure detection output from the detection device to have predetermined characteristics.

The load measurement device may be configured in any way as long as the load measurement device can measure the load applied to the input tool when the pressure detector of the input tool detects the pressure.

It is to be noted that the embodiment of the present disclosure is not limited to the foregoing embodiment, and that various changes can be made without departing from the spirit of the present disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A characteristic adjustment system of pressure detection output, comprising:

an input tool that, in operation, performs an input operation by being brought into contact with an input surface and that includes a pressure detector that, in operation, detects a pressure applied to a portion of the input tool in contact with the input surface;

a detection device that, in operation, generates pressure detection output by acquiring information regarding the pressure detected by the pressure detector of the input tool;

a load measurement device that is spaced apart from the pressure detector and that, in operation, measures a load applied to the input tool; and an adjustment device that, in operation, adjusts the pressure detection output from the detection device such that the pressure detection output has characteristics in a predetermined relation to a load measurement result from the load measurement device, based on the load measurement result from the load measurement device and the pressure detection output from the detection device in a state in which the load measured by the load measurement device is applied to the input tool.

2. The characteristic adjustment system of pressure detection output according to claim 1, wherein:

the load measurement device is attachable to the input tool, and when the pressure is applied to a contact portion of the input tool to which the load measurement device is attached, the pressure detector detects the pressure while the load measurement device measures the load.

3. The characteristic adjustment system of pressure detection output according to claim 2, wherein:

the input tool has a pen shape, the load measurement device includes a recess for inserting the input tool with the pen shape therein, the load measurement device being provided at a bottom of the recess, and when the pressure is applied to the contact portion of the input tool in a state in which a portion of the input tool that is opposite to the contact portion is inserted into the recess, the pressure detector detects the pressure while the load measurement device measures the load.

4. The characteristic adjustment system of pressure detection output according to claim 1, further comprising:

an information processing device that, in operation, receives the pressure detection output from the detection device and that performs processing such that the pressure detection output is reflected in a display image corresponding to the input operation performed by the input tool on the input surface, wherein:

the adjustment device, in operation, adjusts the pressure detection output from the detection device by generating adjustment information that makes the pressure detection output have the characteristics in the predetermined relation to the load measurement result from the load measurement device, and the information processing device, in operation, uses the adjustment information generated by the adjustment device, to correct the pressure detection output from the detection device.

5. The characteristic adjustment system of pressure detection output according to claim 4, wherein:

the information processing device includes the adjustment device.

6. The characteristic adjustment system of pressure detection output according to claim 1, wherein:

the adjustment device, in operation, adjusts the pressure detection output from the detection device by generating adjustment information for making the pressure detection output have the characteristics in the predetermined relation to the load measurement result from the load measurement device, and the detection device, in operation, uses the adjustment information generated by the adjustment device, to correct the pressure detection output.

7. The characteristic adjustment system of pressure detection output according to claim 6, wherein:

the detection device includes the adjustment device.

8. The characteristic adjustment system of pressure detection output according to claim 1, wherein:

the input tool is a position indicator, and the detection device includes a position detection sensor that, in operation, interacts with a signal transmitted by the position indicator to detect an input operation position of the input tool on the input surface.

9. The characteristic adjustment system of pressure detection output according to claim 8, wherein:

the position indicator is of an electromagnetic resonance type.

10. The characteristic adjustment system of pressure detection output according to claim 8, wherein:

the position indicator is of a capacitance type.

11. The characteristic adjustment system of pressure detection output according to claim 1, wherein the adjustment device, in operation:

holds information regarding reference characteristics of the pressure detection output from the detection device with respect to the load applied to the input tool, and adjusts the pressure detection output from the detection device such that the characteristics of the pressure detection output correspond to the reference characteristics with respect to the load measurement result from the load measurement device.

12. The characteristic adjustment system of pressure characteristic detection output according to claim 1, wherein the adjustment device, in operation:

receives setting input of a value of the pressure detection output from the detection device, the value of the pressure detection output being relative to each of one or more values of the load measurement result from the load measurement device, and adjusts the pressure detection output from the detection device such that the characteristics of the pressure detection output have a set and input value with respect to the load measurement result from the load measurement device.

13. The characteristic adjustment system of pressure detection output according to claim 1, wherein the adjustment device, in operation:

holds information regarding a plurality of types of characteristics as the characteristics of the pressure detection output from the detection device with respect to the load applied to the input tool, receives a selection of one of the plurality of types of characteristics, and adjusts the pressure detection output from the detection device with respect to the load measurement result from the load measurement device such that the characteristics of the pressure detection output are brough into line with the one of the plurality of types of characteristics.

14. The characteristic adjustment system of pressure detection output according to claim 13, wherein:

the plurality of types of characteristics is set in advance according to types of the input tool.

15. A characteristic adjustment method of pressure detection output, the method comprising:

generating, by a detection device, pressure detection output by acquiring information regarding a pressure detected by a pressure detector of an input tool that performs an input operation by being brought into contact with an input surface and that includes the pressure detector that detects the pressure applied to a portion of the input tool in contact with the input surface;

measuring, by a load measurement device that is spaced apart from the pressure detector, a load applied to the input tool; and adjusting, by an adjustment device, the pressure detection output from the detection device such that the pressure detection output has characteristics in a predetermined relation to a load measurement result from the load measurement device, based on the load measurement result obtained in the measuring by the load measurement device and the pressure detection output obtained in the generating by the detection device in a state in which the load measured by the load measurement device is applied to the input tool.

16. The characteristic adjustment method of pressure detection output according to claim 15, wherein:

the load measurement device has an attachment portion to be attached to the input tool, and when the pressure is applied to a contact portion of the input tool to which the attachment portion of the load measurement device is attached, the pressure detector detects the pressure while the load measurement device measures the load.

17. The characteristic adjustment method of pressure detection output according to claim 16, wherein:

the input tool has a pen shape, the attachment portion of the load measurement device has a recess for inserting the input tool with the pen shape therein, the load measurement device being provided at a bottom of the recess, and when the pressure is applied to the contact portion of the input tool in a state in which a portion of the input tool that is opposite to the contact portion is inserted into the recess, the pressure detector detects the pressure while the load measurement device measures the load.

* * * * *